United States Patent
Yoo et al.

(10) Patent No.: US 11,472,433 B2
(45) Date of Patent: Oct. 18, 2022

(54) ADVANCED DRIVER ASSISTANCE SYSTEM, VEHICLE HAVING THE SAME AND METHOD FOR CONTROLLING THE VEHICLE

(71) Applicants: Hyundai Motor Company, Seoul (KR); Kia Motors Corporation, Seoul (KR)

(72) Inventors: Sujung Yoo, Incheon (KR); Donghwi Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 87 days.

(21) Appl. No.: 16/951,667

(22) Filed: Nov. 18, 2020

(65) Prior Publication Data

US 2021/0323574 A1    Oct. 21, 2021

(30) Foreign Application Priority Data

Apr. 21, 2020 (KR) ........................ 10-2020-0048249

(51) Int. Cl.
*B60W 60/00*        (2020.01)
*B60W 40/06*        (2012.01)
(Continued)

(52) U.S. Cl.
CPC ...... *B60W 60/001* (2020.02); *B60W 30/0956* (2013.01); *B60W 30/143* (2013.01); *B60W 30/18163* (2013.01); *B60W 40/06* (2013.01); *G01C 21/3492* (2013.01); *G01C 21/3691* (2013.01); *G06T 7/70* (2017.01); *G06V 20/58* (2022.01); *G06V 20/588* (2022.01);
(Continued)

(58) Field of Classification Search
CPC ........... B60W 60/001; B60W 30/0956; B60W 30/143; B60W 30/18163; B60W 40/06; B60W 2552/53; B60W 2420/42; G06T 7/70; G06T 2207/30256; G06T 2207/30261; G06V 20/58; G06V 20/588; G06V 2201/08; G01C 21/3492; G01C 21/3691; G08G 1/166
See application file for complete search history.

(56) References Cited

U.S. PATENT DOCUMENTS 9,775,004 B2 *   9/2017  Cawse ................. G08G 1/0112
2005/0015203 A1 *  1/2005  Nishira ................ B60W 50/16
                                                    340/436
(Continued)

*Primary Examiner* — Hussein Elchanti
(74) *Attorney, Agent, or Firm* — Fox Rothschild LLP

(57) ABSTRACT

A control method of a vehicle may include generating navigation information based on destination information and current location information; determining whether a lane to be driven is a merge lane based on the generated navigation information, map information, and the current location information; recognizing a lane in an image acquired by an imaging device; recognizing a driving first lane based on the recognized location information of the lane; dividing a certain area including the merge lane into an entry section, a merge section, and a stabilization section when the first lane converges with a second lane; generating a driving route by performing curve fitting for route points in the entry section and the merge section; and controlling autonomous driving based on the generated driving route.

20 Claims, 8 Drawing Sheets

(51) Int. Cl.
  *B60W 30/18* (2012.01)
  *B60W 30/14* (2006.01)
  *B60W 30/095* (2012.01)
  *G08G 1/16* (2006.01)
  *G01C 21/36* (2006.01)
  *G06T 7/70* (2017.01)
  *G01C 21/34* (2006.01)
  *G06V 20/58* (2022.01)
  *G06V 20/56* (2022.01)

(52) U.S. Cl.
  CPC ......... *G08G 1/166* (2013.01); *B60W 2420/42* (2013.01); *B60W 2552/53* (2020.02); *G06T 2207/30256* (2013.01); *G06T 2207/30261* (2013.01); *G06V 2201/08* (2022.01)

(56) References Cited

U.S. PATENT DOCUMENTS

| | | | |
|---|---|---|---|
| 2010/0161192 A1* | 6/2010 | Nara | B60W 30/18145 |
| | | | 701/1 |
| 2017/0018189 A1* | 1/2017 | Ishikawa | B62D 15/0255 |
| 2018/0354518 A1* | 12/2018 | Inou | B60W 30/18163 |
| 2019/0071099 A1* | 3/2019 | Nishiguchi | B60W 30/18163 |
| 2019/0084572 A1* | 3/2019 | Oishi | B60Q 1/34 |
| 2022/0105869 A1* | 4/2022 | Pryke | G06T 7/60 |

* cited by examiner

ADVANCED DRIVER ASSISTANCE SYSTEM, VEHICLE HAVING THE SAME AND METHOD FOR CONTROLLING THE VEHICLE

CROSS-REFERENCE TO RELATED APPLICATION(S)

This application claims under 35 U.S.C. § 119 the benefit of Korean Patent Application No. 10-2020-0048249, filed on Apr. 21, 2020, the entire contents of which are incorporated by reference herein.

BACKGROUND

1. Technical Field

The present disclosure relates to an advanced driver assistance system, a vehicle having the same, and a method for controlling the vehicle for recognizing a lane and providing driving assistance information to a driver based on the recognized lane information.

2. Description of the Related Art

A vehicle is may be described as a machine that is driven by driving wheels for the purpose of transporting people or cargo, and which is configured to travel on a road. Such a vehicle may cause an accident due to its own failure while driving on the road, or an accident may occur due to negligence of a driver, negligence of other vehicles, or road conditions.

Recently, various advanced driver assistance systems (ADAS) have been developed that transmit driving information of the vehicle to the driver or perform autonomous driving for the driver's convenience in order to prevent accidents caused by the driver error.

As an example of the driver assistance device, there is a collision avoidance device that detects an obstacle around the vehicle and informs the driver of collision information based on distance information to the detected obstacle.

As another example, there is a parking assist device that acquires an image of the rear of a vehicle when parking and displays the acquired image.

As another example, there is a lane departure warning device that recognizes a lane of a road on which a vehicle is driving, determines whether a lane is deviating based on information on the recognized lane, and warns a driver when it is determined that the lane is deviating.

As another example, there is an autonomous driving control device that recognizes a road environment (road information, lanes, obstacles, traffic signals, etc.), determines the driving situation, and automatically drives to a destination by controlling the driving of a vehicle according to a planned driving route.

The autonomous driving control device recognizes and controls only one lane even though a width of the lane is widened when the lane to be driven in by the vehicle is a merge lane, so there is difficulty in providing control to avoid collision with other vehicles.

SUMMARY

In view of the above, an aspect of the present disclosure provides a driver assistance device, a vehicle having the same, and a control method thereof for recognizing a merge lane using map information and image information and guiding driving based on information on the recognized merge lane.

An aspect of the present disclosure provides a driver assistance device, a vehicle having the same, and a control method thereof for recognizing one lane and driving and controlling to follow a center of the lane based on the rate of change in the lane width when the width of the merge lane becomes wider.

In accordance with an aspect of the present disclosure, a driver assistance device may include an image device configured to acquire an image of a road; and a controller configured to recognize a lane in the image acquired by the imaging device, recognize a first lane on which the vehicle is traveling based on the recognized position information of the lane, and generates a driving route based on the location information of one of the two lanes forming the first lane before the first lane and the second lane converges and the lane width of the first lane when the recognized first lane is a lane that converges with the second lane, and controls autonomous driving based on the generated driving route.

The driver assistance device may further include a communicator configured to receive current location information; a storage configured to store map information; and an input configured to receive destination information; and the controller may generate navigation information based on the destination information and the current location information, and determines whether the lane to be traveled is a merge lane based on the generated navigation information, the map information, and the current location information.

The controller may divide a certain area including merge lane into an entry section, a merge section, and a stabilization section, generates route points within the entry section and the merge section based on the lane width of the first lane and the location information of one lane, generates a route point based on the lane width of the merge lane and the location information of one lane in the stabilization section, and generates the driving route by connecting the route point of the entry section, the merge section, and the stabilization section.

The controller may connect the route points in the entry section and the merge section and the route point of the stabilization section by performing curve fitting.

The entry section is a section from a first point where the first lane and the second lane are changed to one lane and a predetermined distance before, and the merge section is a section from the first point to a second point at which a rate of change of the width of the lane is less than or equal to a reference rate of change, and the stabilization section is a section after the second point.

The driver assistance device may further include an obstacle detector configured to detect other vehicles; and the controller may set a region of interest based on location information and preset distance information of the merge section, and acquire location information and speed information of the other vehicles detected by the obstacle detector; acquire time information for the other vehicles to enter the set region of interest based on the acquired location information and the speed information of the other vehicle; and adjust the driving speed based on the acquired time information, target driving speed and current location information.

The first lane and the second lane may each constitute multiple lanes that are merged together.

The driver assistance device may further include an obstacle detector configured to detect other vehicles; and the controller may acquire location information and speed information of the other vehicles detected by the obstacle detector, and adjust driving speed based on the location information and the speed information of the acquired other vehicles.

The controller acquires an acceleration amount and a deceleration amount of the other vehicle based on the acquired location information and the speed information of the other vehicle, generates a speed profile based on the acceleration amount and the deceleration amount and adjusts the driving speed based on the generated speed profile.

In accordance with an aspect, a vehicle may comprise an image device configured to acquire an image of a road; a communicator configured to receive current location information; a storage configured to store map information; an input configured to receive destination information; and a controller configured to generate navigation information based on the destination information and the current location information, determine whether a lane to be driven is a merge lane based on the generated navigation information, the map information, and the current location information, recognize a lane in the image acquired by the image device, recognize a first lane based on the current location information of the lane, generate a driving route based on the location information of the first lane and a lane width of the first lane when the first lane converges with a second lane, and control autonomous driving based on the generated driving route.

The controller divides a certain area including merge lane into an entry section, a merge section, and a stabilization section, generates route points within the entry section and the merge section based on the lane width of the first lane and the location information of one lane, generates a route point based on the lane width of the merge lane and the location information of one lane in the stabilization section, and generates the driving route by performing curve fitting for the route points in the entry section and the merge section, and the stabilization section.

The entry section is a section from a first point where the first lane and the second lane are changed to one lane and a predetermined distance before, and the merge section is a section from the first point to a second point at which a rate of change of the width of the lane is less than or equal to a reference rate of change, and the stabilization section is a section after the second point.

The vehicle may further include an obstacle detector configured to detect other vehicles; and the controller may acquire location information and speed information of the other vehicles detected by the obstacle detector when driving in the entry section, determine whether the other vehicle is driving in the merge section based on the acquired location information of the other vehicle, and control to follow the other vehicle based on the speed information of the other vehicle when it is determined that the other vehicle is driving in the merge section.

The vehicle may further include an obstacle detector configured to detect other vehicles; and the controller may set a region of interest based on location information and preset distance information of the merge section, and determine whether there is other vehicle driving on the second lane based on the location information of the other vehicle detected by the obstacle detector, acquire time information for the other vehicles to enter the set region of interest based on the acquired location information and the speed information of the other vehicle driving on the second lane; and adjust the driving speed based on the acquired time information, target driving speed and current location information when it is determined that there is the other vehicle driving on the second lane.

The controller may acquire an acceleration amount and a deceleration amount of the other vehicle based on the location information and speed information of the other vehicle driving on the second lane, generate a speed profile based on the acceleration amount and the deceleration amount, and adjust the driving speed based on the generated speed profile.

The vehicle may further include an obstacle detector configured to detect other vehicles; and the controller may determine whether there is the other vehicle driving on the second lane based on the location information of the other vehicle detected by the obstacle detector, and adjust the driving speed based on the location information and speed information of the other vehicle when it is determined that there is the other vehicle driving on the second lane.

In accordance with an aspect, a controlling method of a vehicle may include: generating navigation information based on destination information and current location information; determining whether a lane to be driven is a merge lane based on the generated navigation information, the map information, and the current location information; recognizing a lane in an image acquired by an imaging device; recognizing a first lane based on the recognized location information of the lane; dividing a certain area including the merge lane into an entry section, a merge section, and a stabilization section when the recognized first lane converges with a second lane, generating a route point within the entry section and the merge section based on a width of the first lane and the current location information, generating a route point based on the width of the lane of the first lane in the stabilization section and the location information of the one lane; generating a driving route by performing curve fitting for the route points in the entry section and the merge section; and controlling autonomous driving based on the generated driving route. The method may further include setting a region of interest based on the location information and preset distance information of the merge section; determining whether there is another vehicle traveling on the second lane based on the location information of the other vehicle detected by the obstacle detector; acquiring time information for the other vehicle to enter the set region of interest based on the location information and speed information of the other vehicle when it is determined that there is the other vehicle driving the second lane; acquiring an acceleration amount and a deceleration amount of the other vehicle based on the acquired time information, target driving speed and the current location information, and generating a speed profile based on the acceleration amount and the deceleration amount; and controlling the driving speed based on the generated speed profile.

Generating the speed profile may include generating the speed profile to overtake the other vehicle when the acceleration amount of the other vehicle is less than the deceleration amount; and generating the speed profile to follow the other vehicle when the deceleration amount of the other vehicle is less than the acceleration amount.

The method may further include acquiring the location information and the speed information of the other vehicle detected by the obstacle detector when driving in the entry section; determining whether the other vehicle is driving in the merge section based on the acquired location information of the other vehicle; and controlling the driving speed to follow the other vehicle based on the speed information of the other vehicle when it is determined that the other vehicle is driving in the merge section.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
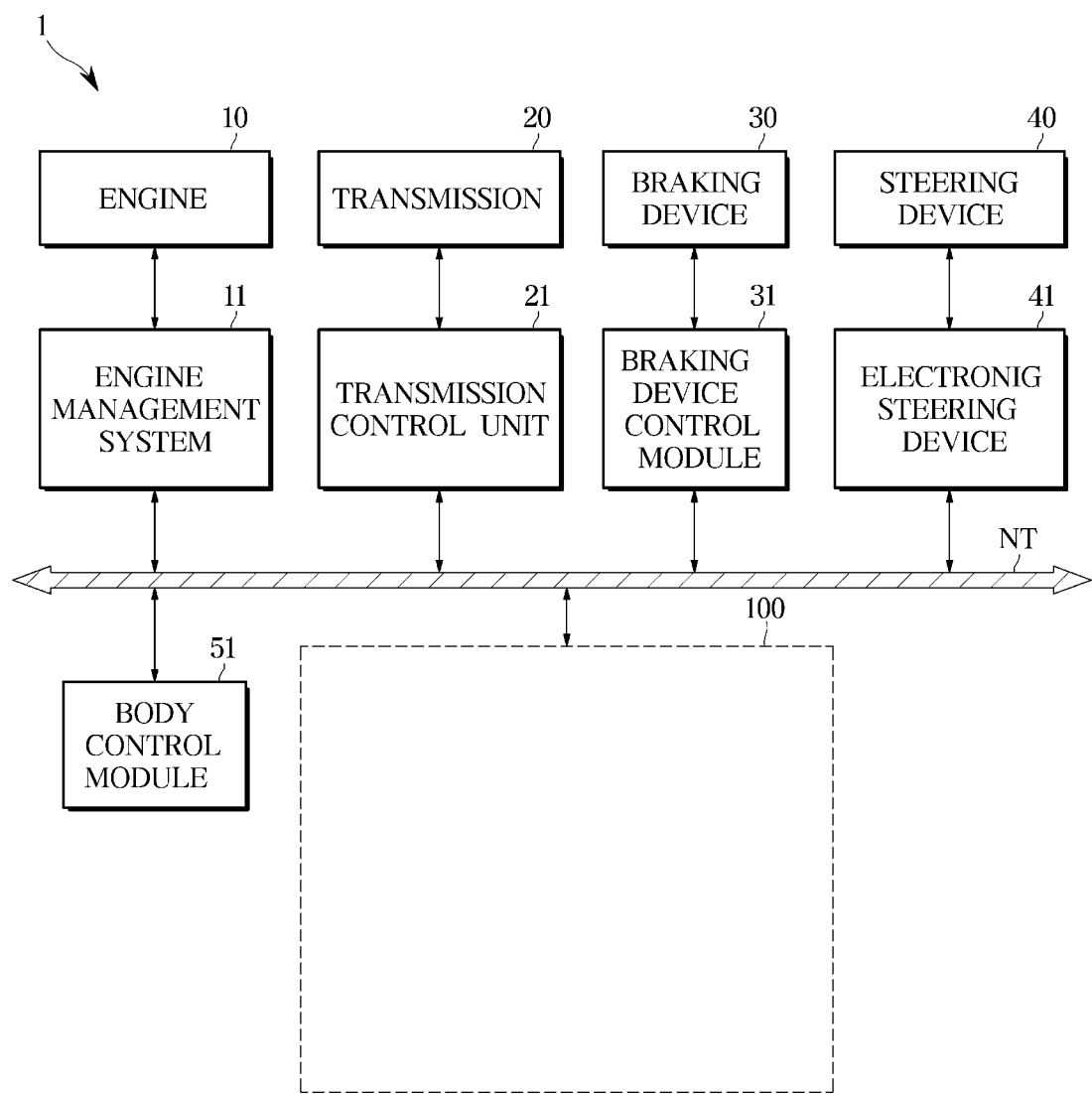
FIG. 1 is a block diagram of a vehicle provided with a driver assistance device according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals refer to like elements throughout. The present disclosure does not describe all elements of the embodiments, and overlaps between the general contents or the embodiments in the technical field to which the present invention belongs.

This specification does not describe all elements of the exemplary embodiments of the present disclosure and detailed descriptions on what are well known in the art or redundant descriptions on substantially the same configurations may be omitted.

Throughout the specification, when an element is referred to as being "connected to" another element, it may be directly or indirectly connected to the other element and the "indirectly connected to" includes being connected to the other element via a wireless communication network.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present invention.

Figure 2:
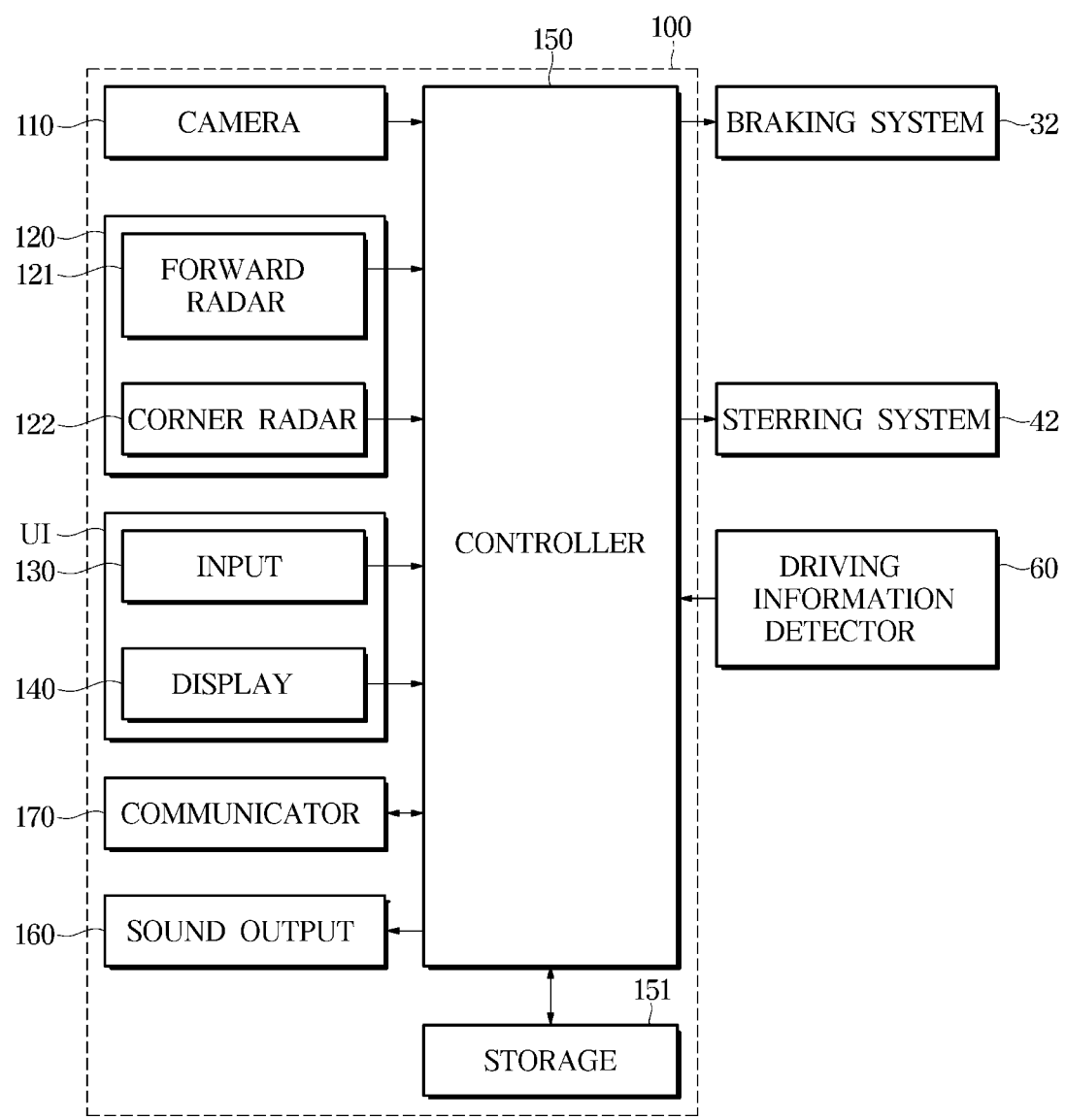
FIG. 2 is a control configuration diagram of a driver assistance device according to an embodiment.
Figure 3:
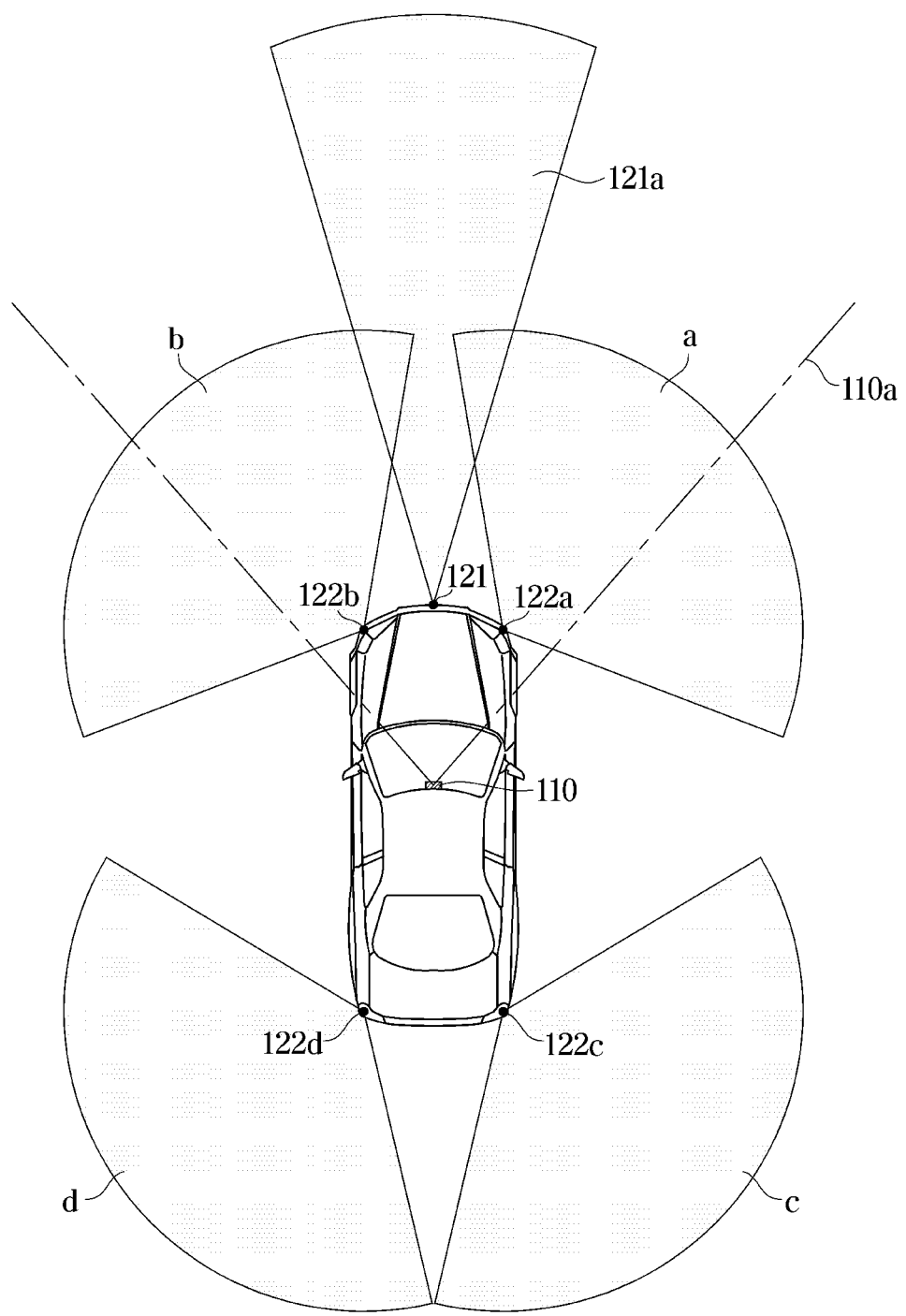
FIG. 3 is a diagram of an imaging device and a radar detection area provided in a driver assistance device according to an embodiment.
Figure 4:
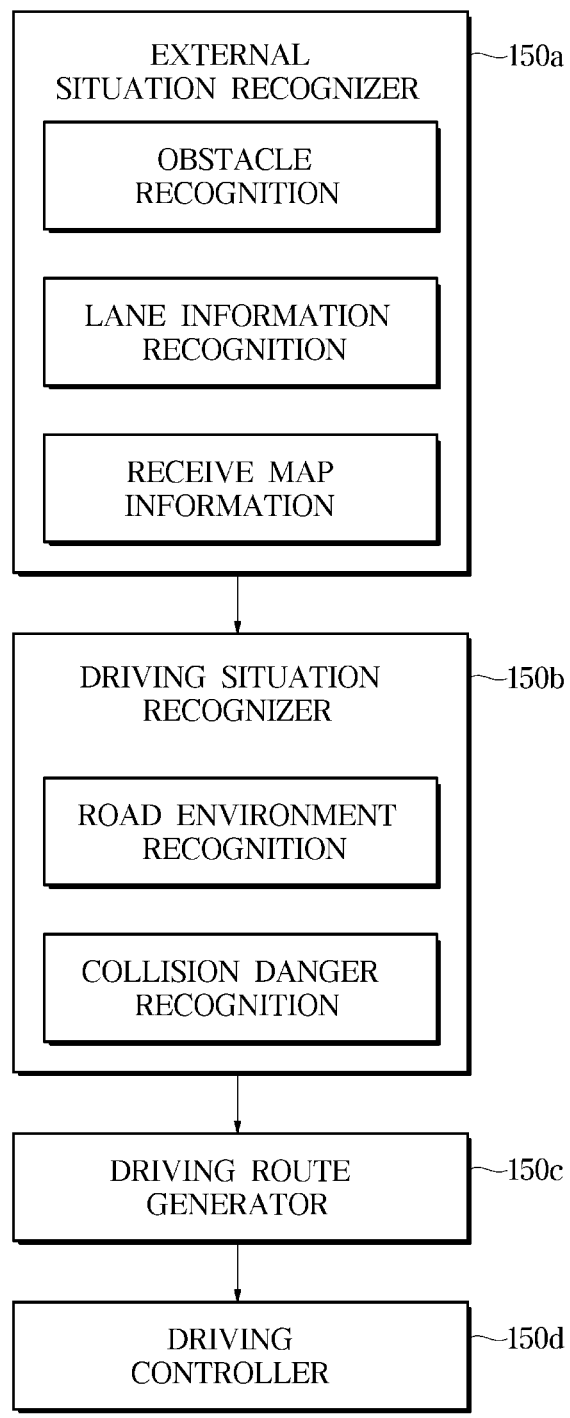
FIG. 4 is a detailed configuration diagram of a controller provided in a driver assistance apparatus according to an embodiment.

FIG. 1 is a block diagram of a vehicle provided with a driver assistance device according to an embodiment. FIG. 2 is a control configuration diagram of a driver assistance device according to an embodiment. FIG. 3 is a diagram of an imaging device and a radar detection area provided in a driver assistance device according to an embodiment. FIG. 4 is a detailed configuration diagram of a controller provided in a driver assistance apparatus according to an embodiment.

The vehicle according to the embodiment may be an internal combustion engine vehicle or an eco-friendly vehicle.

The vehicle according to the embodiment may be a vehicle that performs a manual driving mode in which a driver drives in response to a driving will and an autonomous driving mode that autonomously drives to a destination.

When driving in the manual driving mode, information about attention to the merge lane and lane departure from the merge lane is output, or when driving in the autonomous driving mode, it may be a vehicle having a driver assistance device that controls driving in a merge lane.

In this embodiment, an internal combustion engine vehicle having a driver assistance device will be described as an example.

Referring to FIG. 1, the vehicle 1 may include an engine 10, a transmission 20, a brake device 30, and a steering device 40.

The engine 10 includes a cylinder and a piston, and may generate power for the vehicle 1 to travel.

The transmission 20 includes a plurality of gears, and may transmit power generated by the engine 10 to a wheel.

The braking device 30 can decelerate the vehicle 1 or stop the vehicle 1 through friction with a wheel.

The steering device 40 may change the driving direction of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a Driver Assistance System (DAS) 100.

The EMS 11 may control the engine 10 in response to either the driver's acceleration intention from the acceleration pedal or a request signal from the driver assistance system (DAS) 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The electronic brake control module (EBCM) 31 may control a brake device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS).

The EBCM 31 may selectively release braking of wheels in response to oversteering and/or understeering detected in a steering mode of the vehicle 1, resulting in implantation of Electronic Stability Control (ESC).

In addition, the EBCM 31 may temporarily brake wheels in response to wheel slippage detected by vehicle driving, resulting in implementation of a Traction Control System (TCS).

The electronic power steering (EPS) device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like.

The driver assistance system (DAS) 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., host vehicle), and may perform driving, braking, and/or steering of the vehicle 1 in response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The driver assistance system 100 may include a collision avoidance device that outputs notification information about a collision with an obstacle or avoids an obstacle in order to prevent a collision with an obstacle.

The driver assistance system 100 provides an autonomous driving control device that automatically drives to a destination by controlling the driving of the vehicle according to the planned driving route while avoiding the obstacles, determining the obstacles and driving conditions by the vehicle itself.

The driver assistance system 100 can transmits a drive control signal, a braking control signal, and a steering control signal to the engine management system 11, the electronic braking control module 31, and the electronic steering control device 41, respectively, through a vehicle communication network NT.

As shown in FIG. 2, the driver assistance system 100 includes an image device 110, an obstacle detector 120, an input 130: a display 140, a controller 150, a storage 151, a sound output 160, and a communicator 170.

The imaging device 110 is an image acquisition unit that acquires image data around the vehicle 1 and image data of a road. The imaging device 110 may photograph the front of the vehicle 1 and recognize other vehicles, pedestrians, cyclists, lanes, road signs, and the like.

There may be one or a plurality of imaging devices 110.

The plurality of imaging apparatuses 110 may acquire images of roads in different directions. For example, the plurality of imaging devices may include a front camera that acquires an image of a road in front of the vehicle and a rear camera that acquires an image of a road behind the vehicle.

Here, the front camera may be provided on the window glass at the front of the vehicle, but may be provided on the window glass inside the vehicle, the front panel, the interior mirror or the roof panel may be provided but exposed to the outside, or may be provided on a license plate, a grille on the front of the vehicle, or an emblem on the front of the vehicle. The field of view of the front camera provided on the roof panel may be in front of the vehicle.

The rear camera is provided on the window glass at the rear of the vehicle, but may be provided on the window glass inside the vehicle, and the rear panel, tail gate, license plate at the rear of the vehicle, or the emblem or roof panel at the rear of the vehicle are provided but exposed to the outside. The field of view of the rear camera provided on the roof panel may be the rear of the vehicle.

Cameras are provided on the left and right side mirrors to acquire images of roads on the left and right sides and rear of the vehicle.

The camera may include a CCD or CMOS image sensor, and may also include a three-dimensional spatial recognition sensor such as KINECT (RGB-D sensor), TOF (Structured Light Sensor), stereo camera, and the like.

The imaging device may be a camera for lane departure warning, a camera for autonomous driving control, a camera for a black box, or a camera for detecting an obstacle.

The rear camera may be a camera for parking assistance, a camera of a peripheral monitoring device (SVM: Surround View Monitor, or AVM), a camera of a blind spot detection (BSD), or a camera of a rear detection device.

The obstacle detector 120 acquires obstacle data around the vehicle 1.

The driver assistance device may obtain a relative position, a relative speed, and the like of obstacles (e.g., other vehicles, pedestrians, cyclists, etc.) around the vehicle 1 from the obstacle data.

The obstacle detector 120 may include a front radar 121 and a plurality of corner radars 122 (122a, 122b, 122c, 122d).

The obstacle detector 120 may further include at least one of a light detection and ranging (lidar) sensor and an ultrasonic sensor.

As shown in FIG. 3, the imaging device 110 may photograph the front of the vehicle 1 and acquire image data of the front of the vehicle 1. The imaging device 110 may have a field of sensing 110a facing the front of the vehicle 1.

The imaging device 110 may include a plurality of lenses and an image sensor. The image sensor may include a plurality of photodiodes that convert light into electrical signals, and the plurality of photodiodes may be arranged in a two-dimensional matrix.

The imaging device 110 may be electrically connected to the controller 150. For example, the imaging device 110 is connected to the first control unit 140 through a vehicle communication network (NT), or connected to the controller 150 through a hard wire, or a printed circuit board (PCB). The imaging device 110 may transmit image data in front of the vehicle 1 to the controller 150.

The front radar 121 may have a field of sensing 121a facing the front of the vehicle 1. The front radar 120 may be installed, for example, on a grill or bumper of the vehicle 1.

The front radar 121 may include a transmission antenna (or a transmission antenna array) that radiates a transmission wave toward the front of the vehicle 1, and a reception antenna (or a reception antenna array) that receives a reflected wave reflected from an obstacle.

The front radar 121 may obtain front radar data from a transmitted transmission wave by a transmitting antenna and a reflected wave received by a receiving antenna.

The front radar data may include location information and speed levels of other vehicles or pedestrians or cyclists located in front of the vehicle 1.

The front radar 121 calculates the relative distance to the obstacle based on the phase difference (or time difference) between the transmitted and reflected waves, and calculates the relative speed of the obstacle based on the frequency difference between the transmitted and reflected waves.

The front radar 121 may be connected to the controller 150 through, for example, a vehicle communication network (NT) or a hard wire or a printed circuit board. The front radar 121 may transmit front radar data to the controller 150.

The plurality of corner radars 122 include a first corner radar 122a installed on the front right side of the vehicle 1, a second corner radar 122b installed on the front left side of the vehicle 1, a third corner radar (122c) installed on the rear right side of and a fourth corner radar (122d) installed on the rear left side of the vehicle (1).

The first corner radar 122a may have a detection field a toward the front right side of the vehicle 1. The first corner radar 122a may be installed on the right side of the front bumper of the vehicle 1.

The second corner radar 122b may have a sensing field b facing the front left of the vehicle 1 and may be installed on the left side of the front bumper of the vehicle 1.

The third corner radar 122c may have a detection field c facing the rear right side of the vehicle 1 and may be installed on the right side of the rear bumper of the vehicle 1.

The fourth corner radar 122d may have a detection field d toward the rear left of the vehicle 1 and may be installed on the left side of the rear bumper of the vehicle 1.

Each of the first, second, third and fourth corner radars 122a, 122b, 122c, and 122d may include a transmit antenna and a receive antenna.

The first, second, third, and fourth corner radars 122a, 122b, 122c, and 122d acquire first corner radar data, second corner radar data, third corner radar data, and fourth corner radar data, respectively.

The first corner radar data may include distance information and speed levels of other vehicles, pedestrians, or cyclists (hereinafter referred to as "obstacles") positioned to the right in front of the vehicle 1.

The second corner radar data may include distance information and speed level of an obstacle positioned on the front left of the vehicle 1.

The third and fourth corner radar data may include distance information and speed information of obstacles located at the rear right of the vehicle 1 and the rear left of the vehicle 1.

Each of the first, second, third and fourth corner radars 122a, 122b, 122c, and 122d may be connected to the controller 150 through a vehicle communication network NT, a hard wire, or a printed circuit board. The first, second, third, and fourth corner radars 122a, 122b, 122c, and 122d may transmit first, second, third, and fourth corner radar data to the controller 150, respectively.

The input 130 receives user commands. Such an input unit may receive an operation command for various functions that can be performed in the vehicle as a user command.

The input 130 receives an operation command of at least one of a lane departure warning mode and an autonomous driving mode.

The input 130 may receive an operation command of at least one of a navigation mode and a map display mode.

The input 130 can also receive destination information in the navigation mode or autonomous driving mode.

The input 130 may be provided on the head unit and the center fascia, and may include at least one physical button such as an operation on/off button for various functions, a button for changing setting values of various functions, and the like, and may further include a jog dial (not shown) or a touch pad for inputting a movement command and selection command of the cursor displayed on the display 140.

The display 140 displays information on functions being performed in the vehicle and information input by the user.

The display 140 displays information on the audio function, video function, navigation function, DMB function, and radio function, and also displays lane departure information in lane departure warning mode.

The display 140 can display autonomous driving control information, and it is also possible to display images around the vehicle in autonomous driving mode.

When displaying an image around a vehicle, the display 140 may display a high-definition image, a low-quality image, or a top-view image. Here, the top view image may be a top view image in the form of an around view.

The display 140 displays a map image within a certain range from the current location of the vehicle in the map display mode, displays map information matched with route information from the current location to the destination in the navigation mode, and displays road guidance information.

The input and the display may be a user interface (UI). The display may include a display panel, and the input may include a touch panel. That is, a touch screen in which a touch panel is integrated with the display panel may be provided.

The display 140 may include a cluster. These clusters display autonomous driving control information, information on merge lanes during autonomous driving control, and lane departure warning information when the lane can be recognized normally.

The display 140 may be provided on a head unit or a vehicle terminal.

The controller 150 generates a route from the current location to the destination based on the current location information and destination information received by the location receiving unit in the navigation mode or the autonomous driving mode, and controls driving through the generated route.

When a plurality of routes are generated, the controller 150 may control driving based on information on a route selected by input 130 among the plurality of routes.

The controller 150 generates navigation information by matching the generated route information and the current location information with the map information, and control the display 140 to display the generated navigation information.

The controller 150 may control to drive at a target driving speed when performing the autonomous driving mode. Here, the target driving speed may be a preset driving speed or a driving speed input by a user.

When performing the autonomous driving mode, the controller 150 may communicate with the driving information detection unit 60 and control autonomous driving based on driving information and navigation information detected by the driving information detector 60.

The controller 150 controls the driving based on the navigation information, but controls the driving of the vehicle based on the information of the road and obstacles (ie, other vehicles).

When performing autonomous driving mode, the controller 150 processes the front image data of the imaging device 110, the front radar data of the front radar 121, and the corner radar data of the plurality of corner radars 122, and generates a braking signal and a steering signal for controlling the braking system 32 and the steering system 42.

The controller 150 can recognize obstacles in front of the vehicle 1 based on the front image data of the imaging device 110 and the front radar data of the front radar 121, and acquires position information (direction) and type information (For example, whether the obstacle is another vehicle, or a pedestrian, or a cyclist, or a curb, or a guardrail, or a street tree, or a streetlight, etc.) of recognized obstacles.

Specifically, the controller 150 may obtain position information (distance and direction) and speed information (relative speed) of obstacles in front of the vehicle 1 based on the front radar data of the front radar 121.

In addition, the controller 150 matches the obstacles detected by the forward image data to the obstacles detected by the front radar data, and acquires type information, location information, and speed information of the obstacles in front of the vehicle 1 based on the matching result.

The controller 150 may generate a braking signal and a steering signal based on type information, position information, and speed information of obstacles ahead.

For example, the controller 150 calculates a time to collision (TTC) between the vehicle 1 and the front obstacle based on the position information (relative distance) and speed information (relative speed) of the obstacles ahead, and may warn the driver of a collision, transmit a braking signal to the braking system 32, or transmit a steering signal to the steering system 42 based on the result of comparison between the time to collision and the predetermined reference time.

In response to a time until collision that is less than a predetermined first reference time, the controller 150 may output a warning through audio and/or a display.

In response to a time until collision that is less than the second predetermined reference time, the controller 150 may transmit a pre-braking signal to the braking system 32. Here, the second reference time may be shorter than the first reference time.

The controller 150 calculates a distance to collision (DTC) based on speed information (ie, relative speed) of the obstacles ahead, and may warn the driver of a collision or transmit a braking signal to the braking system 32 based on a result of comparison between the distance to the collision and the distance to the obstacles ahead.

The controller 150 recognizes obstacles on the side of the vehicle 1 (front right, front left, rear right, rear left) based on the corner radar data of the plurality of corner radars 122, and acquires position information (distance and direction) and speed information (relative speed) of recognized obstacles.

When road video information is received, the controller 150 performs image processing to recognize the lane of the road, and recognizes the lane in which the own vehicle is traveling based on the recognized position information of the lane.

The controller 150 generates a tracking line based on information about the recognized lane, information transmitted from the imaging device 110, obstacle detector 120, and driving information detector 60, and generates a driving route based on the position of the generated following line, and controls autonomous driving along the generated driving route.

This tracking line is a line that allows the center of the vehicle body to follow a position in the lane. Here, a position of a lane may be a position of one of two lanes forming a lane or a position in the middle of the two lanes.

The controller 150 determines whether the lane to be driven is a merge lane based on the navigation information while performing the autonomous driving mode, when it is determined that the lane to be driven is a merge lane, the controller 150 recognizes the lane within the merge lane using the image information obtained by the imaging device 110 using the obstacle information obtained by the obstacle detector 120, and the map information stored in the storage, and determines whether there is a collision with another vehicle.

The controller 150 receives the map information stored in the storage 151, and recognizes geographic information and road information of the currently driving road based on the received map information and current location information. Here, the road information includes road type information such as expressways and local roads, toll gate (TG) information, interchange (IC) information, junction change (JC) information, lane information (merge lanes, branch lanes, etc.).

The controller 150 determines whether the lane to be driven after a certain distance based on the current location is a merge lane based on the received map information, navigation information, and current location information. The controller divides the lane area within a certain area from the current position into a plurality of sections when it is determined that the lane to be driven is a merge lane, and acquires the lane width of the merge lane within the lane area. Here, the predetermined distance may be approximately 100 M.

The controller 150 may divide a first point, which is a predetermined distance from the current position, into an entry section, a first point to a second point as a merge section, and a second point to a third point as a stabilization section.

Here, the first point is a point at which two lanes change into one lane, and may be a point at which the width of one lane begins to exceed the reference width.

The second point may be a point where the width of the lane starts to become less than or equal to the reference width. The second point may be a point at which the rate of change of the width of the lane starts to become less than the reference rate of change.

The controller 150 may acquire the width of the lane to the merge lane based on the map information, or may acquire the width of the lane to the merge lane from image data obtained by the imaging device.

The controller 150 may acquire the width of the merge lane based on the map information and the image information of the road.

The controller 150 generates a tracking line in the entry section and the merge section based on the location information of any one of the two lanes and the width of the lane in the entry section, and in the stabilization section, generates a tracking line based on position information at the center of a lane formed by both lanes, and generates a driving route corresponding to the generated tracking line.

The controller 150 determines whether another vehicle exists in the merge lane based on the image information acquired by the imaging device 110. When it is determined that another vehicle exists in the merge lane, the controller 150 acquires location information (relative distance) and speed information (relative speed) with the other vehicle based on the obstacle information detected by the obstacle detector 120. The controller 150 acquires a Time to Collision (TTC) between the vehicle 1 and another vehicle based on the obtained location information (relative distance) and speed information (relative speed).

The controller 150 sets the region of interest based on the location information of the merge section among the plurality of sections. When it is determined that another vehicle exists in the region of interest set based on the driving speed of the own vehicle, the location information of the other vehicle, and the speed information of the other vehicle, the controller 150 generates a speed profile of the own vehicle based on the driving speed of the own vehicle, the location information of the other vehicle, and the speed information of the other vehicle. Further, the controller 150 controls driving based on the generated speed profile.

When the controller 150 receives detection information from the obstacle detector 120 when driving on a merge lane, the controller 150 checks the distances of other vehicles traveling in the lanes in the left and right directions of the own lane based on the received detection information of the obstacle. Also, the controller 150 may check the speed of another vehicle corresponding to the identified distance from the other vehicle, and control acceleration/deceleration based on the identified speed of the other vehicle and the speed of the own vehicle.

For example, the controller 150 checks the speed of other vehicles in the front and rear of the left and right lanes of the own lane, respectively, and maintains or slows down the target driving speed when the speed of another vehicle in front of the merge lane is faster than the speed of the own vehicle, and maintains or accelerates the target driving speed when the speed of other vehicles behind the merge lane is slower than the speed of the own vehicle.

When a lane change command is received through input 130 during manual driving mode, the controller 150 may determine whether or not there is a collision with an obstacle in a merge lane using the image information acquired by the imaging device 110 and the obstacle information acquired by the obstacle detector 120. Here, the lane change command received by the input 130 may include a turn-on command of a left direction indication lamp and a turn-on command of a right direction indication lamp by an operation lever.

The controller 150 may control at least one of the display 140 and the sound output 160 to output warning information indicating a collision caution with another vehicle.

When controlling at least one of display 140 and sound output 160 to output warning information notifying that there is a collision with another vehicle, the controller 150 checks the risk level and adjusts the volume of the warning sound, adjusts the output interval of the warning sound, or adjusts the warning display on the display unit based on the identified risk.

For example, the controller 150 may control the volume of a warning sound to increase as the risk increases, and may control the screen color of the display to become redder as the risk increases.

When driving on a merge lane, the controller 150 may check the degree of risk and change the deceleration amount or control the steering based on the identified risk. For example, the controller 150 can control the reduction amount to increase as the risk increases.

When driving on a merge lane, the controller 150 can also control the lighting of emergency lights based on the identified risk.

The controller 150 may be implemented by a memory (not shown) that stores data on an algorithm for controlling the operation of components in the driver assistance device or a program that reproduces the algorithm, and a processor that performs the above-described operation using data stored in the memory (not shown). In this case, the memory and the processor may be implemented as separate chips, respectively. Alternatively, the memory and processor may be implemented as a single chip.

The storage 151 stores map information and stores information on a predetermined distance and a preset distance.

The storage 151 may be implemented by at least one of a nonvolatile memory devices such as cache, Read Only Memory (ROM), Programmable ROM (PROM), Erasable Programmable ROM (EPROM), Electrically Erasable Programmable ROM (EEPROM), and Flash memory, or a volatile memory device such as random access memory (RAM), or a storage medium such as a hard disk drive (HDD, Hard Disk Drive) or CD-ROM, but is not limited thereto. The storage may be a memory implemented as a separate chip from the processor described above with respect to the control unit, or may be implemented as a processor and a single chip.

The sound output 160 outputs navigation information as sound in response to a control command from the controller 150, and outputs guide information for autonomous driving as sound.

The sound output 160 outputs attention information about attention to the merge lane as sound, and outputs collision information about obstacles as sound. Here, the sound may include a warning sound.

The sound output 160 may output lane departure warning information when the lane can be recognized normally.

The sound output 160 may include at least one speaker provided in the vehicle.

The communicator 170 may include a location receiver that receives location information of a vehicle and transmits the received location information to the controller 150.

The location receiver may include a Global Positioning System (GPS) receiver that calculates the position of a vehicle by performing communication with a plurality of satellites. The location receiver includes a Global Positioning System (GPS) signal receiver and a signal processor that processes a GPS signal acquired by the GPS signal receiver.

Here, the GPS (Global Positioning System) signal receiver includes an antenna for receiving signals from a plurality of GPS satellites. This antenna may be provided on the exterior of the vehicle.

The signal processing part of the location receiver includes a Software for obtaining a current location using distance and time information corresponding to the location signals of a plurality of GPS satellites and an output unit that outputs the acquired location information of the vehicle.

The communicator 170 may communicate with various electronic devices in a vehicle.

The communicator 170 may communicate with other vehicles, infrastructure, and servers.

The communicator 170 further includes an antenna for receiving signals from GPS satellites and broadcasting stations, and performing wireless vehicle networks (V2X: Vehicle to everything) such as communication with other vehicles (V2V) and communication with infrastructure (V2I).

The communicator 170 may include one or more components that enable communication with an external device, and may include at least one of a short-range communication module, a wired communication module, and a wireless communication module.

The short-range communication module may include various short-range communication modules that transmit and receive signals using a wireless communication network in a short range, such as Bluetooth module, infrared communication module, RFID (Radio Frequency Identification) communication module, WLAN (Wireless Local Access Network) communication module, NFC communication module, Zigbee communication module, etc.

The wired communication module may include various cable communication modules such as CAN (Controller Area Network) communication module, Local Area Network (LAN) module, Wide Area Network (WAN) module or Value Added Network (VAN) module, etc., as well as various wired communication modules such as USB (Universal Serial Bus), HDMI (High Definition Multimedia Interface), DVI (Digital Visual Interface), RS-232 (recommended standard232), power line communication, or POTS (plain old telephone service), etc.

The wireless communication module may include a wireless communication module supporting various wireless communication methods such as GSM (global System for Mobile Communication), CDMA (Code Division Multiple Access), WCDMA (Wideband Code Division Multiple Access), UMTS (universal mobile telecommunications system), TDMA (Time Division Multiple Access), LTE (Long Term Evolution), etc. in addition to a Wi-Fi module and a Wi-Bro module.

The driving information detector 60 detects driving information of a vehicle. Here, the driving information of the vehicle may be information on a driving speed, a driving direction, and a driving distance of the vehicle.

The driving information detector 60 may include a speed detector that detects a driving speed of the vehicle.

The speed detector may include a plurality of wheel speed sensors respectively provided on a plurality of wheels of the vehicle, and may include an acceleration sensor that detects acceleration of the vehicle.

The driving information detector 60 may further include a steering angle detector configured to detect an angle of the steering wheel. The driving information detector 60 may include a yaw rate detector.

At least one component may be added or deleted corresponding to the performance of the components of the driver assistance apparatus illustrated in FIG. 2. Further, it will be readily understood by those of ordinary skill in the art that the mutual positions of the components may be changed corresponding to the performance or structure of the driver assistance device.

As shown in FIG. 4, the controller 150 of the driver assistance device may include an external situation recognizer 150*a*, a driving situation recognizer 150*b*, a driving route generator 150*c*, and a driving controller 150*d*.

The external situation recognizer 150*a* recognizes obstacles in front of the vehicle 1 based on the front image data of the imaging device 110 and the front radar data of the front radar 121, recognizes the side of the vehicle 1 (front right, front left, rear right, rear left) based on the corner radar data of the plurality of corner radars 122, and acquires position information (distance and direction) and speed information (relative speed) of recognized obstacles.

The external situation recognizer 150*a* recognizes a lane on the road by performing image processing on the image data in front of the imaging device 110, and receives the map information stored in storage 151, and recognizes geographic information and road information of the currently driving road based on the received map information and current location information.

Here, the road information includes road type information such as expressways and local roads, toll gate (TG) information, interchange (IC) information, junction change (JC) information, lane information (merge lanes, branch lanes, etc.).

The driving situation recognizer 150*b* recognizes the road environment based on the lane information and map information and recognizes the risk of collision with an obstacle.

More specifically, the driving situation recognizer 150*b* determines whether the lane to be driven is a merge lane based on the received map information, navigation information, and current location information, and acquires the width of the lane of the merge lane when it is determined that the lane to be driven is a merge lane.

The driving situation recognizer 150*b* may acquire the lane width of the merge lane based on the map information, or may acquire the lane width of the merge lane from the image data acquired by the imaging device.

The driving situation recognizer 150b determines whether the lane to be driven is a branch lane based on the received map information, navigation information, and current location information, and if it is determined that the lane to be driven is a branch lane, it is also possible to acquire the width of the branch lane.

The driving situation recognizer 150b may determine whether a lane to be driven after a certain distance based on a current location is a merge lane or a branch lane based on the navigation information and map information.

The driving situation recognizer 150b recognizes the presence and location of other vehicles driving in the merge lane or branch lane to be driven.

The driving route generator 150c generates a tracking line when driving a merge lane or a branch lane and generates a driving route corresponding to the generated tracking line.

The driving route generator 150c determines the possibility of a collision with another vehicle when it is determined that there is another vehicle driving a merge lane or a branch lane. The driving route generator 150c acquires a time to collision (TTC) between the vehicle 1 and another vehicle based on the location information (relative distance) and speed information (relative speed) of the other vehicle. The driving route generator 150c determines the degree of risk based on the acquired time until the collision, and generates an avoidance control strategy capable of avoiding a collision with another vehicle based on the determined degree of risk.

The driving route generator 150c generates a speed profile of the own vehicle based on the location information (relative distance) and speed information (relative speed) of another vehicle. Here, the speed profile of the own vehicle may be an avoidance control strategy for avoiding a collision with another vehicle.

The driving controller 150d controls autonomous driving of the vehicle based on information on the driving route and the avoidance control strategy generated by the driving route generator 150c.

Meanwhile, each component illustrated in FIG. 4 refers to software and/or hardware components such as a Field Programmable Gate Array (FPGA) and an Application Specific Integrated Circuit (ASIC).

Figure 5:
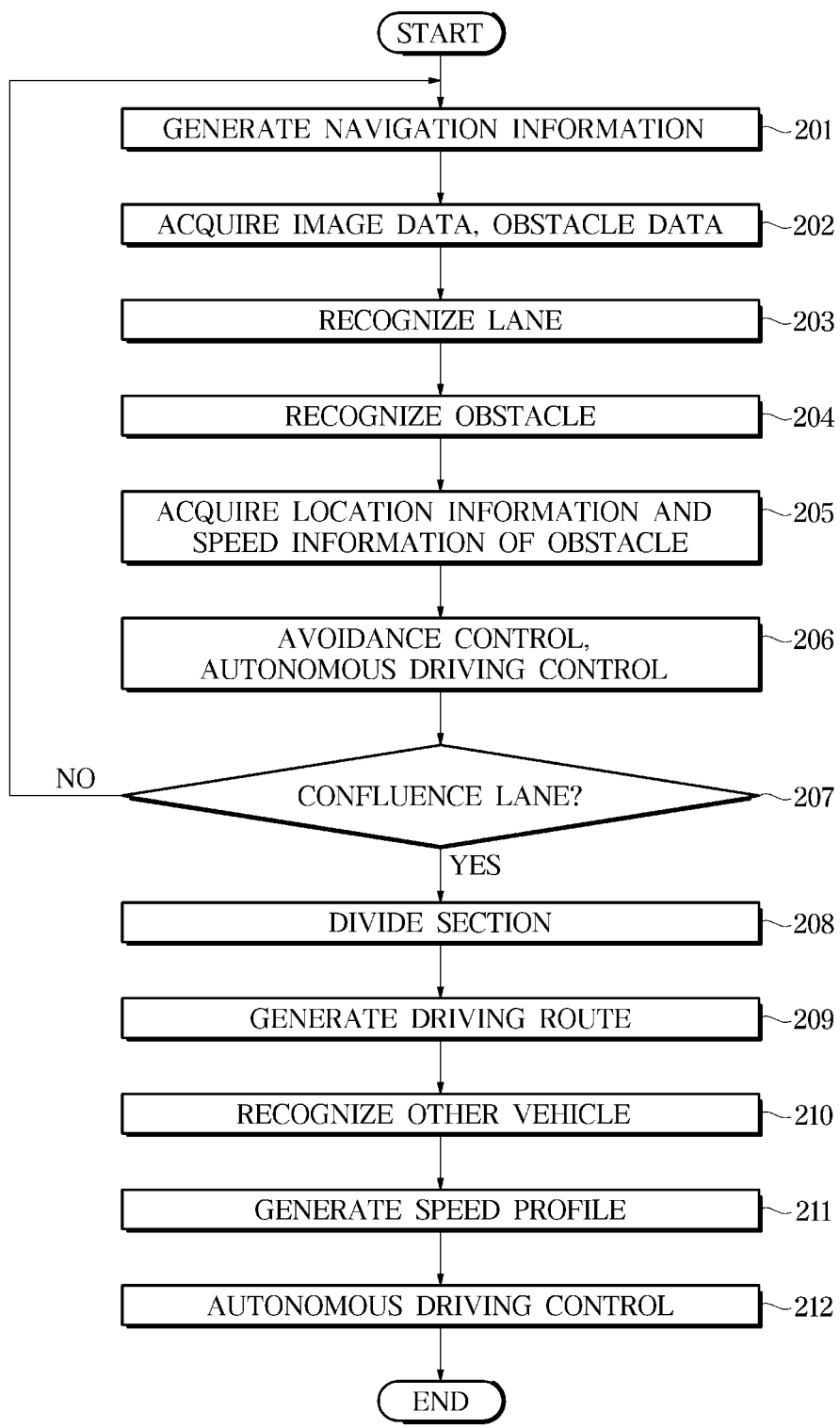
FIG. 5 is a control flowchart of a vehicle equipped with a driver assistance device according to an embodiment.

FIG. 5 is a flowchart illustrating a vehicle control according to an exemplary embodiment, and will be described with reference to FIGS. 6 to 8.

The vehicle generates (201) navigation information from the current location to the destination based on the current location information and destination information received by the location receiving unit in the autonomous driving mode, and controls driving based on the generated navigation information, but controls the vehicle to travel at a target driving speed. Here, the target driving speed may be a preset driving speed or a driving speed input by a user.

The vehicle may display map information in which the navigation information and the current location information are matched through the display 140.

The vehicle may acquire image data of a road through an imaging device, and acquire 202 radar data, which is obstacle data, through an obstacle detector.

The vehicle recognizes a lane of the road by performing image processing on the acquired image data, and recognizes (203) a lane in which the own vehicle is traveling based on the position information of the recognized lane.

The vehicle generates a tracking line based on information on the recognized lane, generates a driving route based on the location of the generated tracking line, and controls autonomous driving along the generated driving route.

Here, the tracking line is a line that allows the center of the vehicle body to follow a position in the lane. Here, any one position of the lane may be a position of any one of two lanes forming the lane. In addition, any one position of the lane may be a position in the middle of the two lanes, and may be a central position of the lane.

The vehicle acquires the width of the lane based on the map information and the current location information stored in the storage, generates a tracking line based on the acquired lane width, and may generate a driving route based on the generated tracking line location information.

The vehicle processes image data of the imaging device 110 during autonomous driving along the driving route, front radar data of the front radar 121, and corner radar data of the plurality of corner radars 122, and recognizes 204 obstacles around the vehicle 1 based on the image data of the imaging device 110, the front radar data of the front radar 121, and the corner radar data of the plurality of corner radars 122.

The vehicle may acquire the position information (direction) and type information of the recognized obstacles (for example, whether the obstacle is another vehicle, or a pedestrian, or a cyclist, or a curb, or a guardrail, or a street tree, or a streetlight, etc.).

The vehicle matches the obstacles detected by the image data to the obstacles detected by the front radar data and the corner radar data, and acquires (205) type information, location information, and speed information of surrounding obstacles of the vehicle 1 based on the matching result.

The vehicle generates at least one of an acceleration signal, a braking signal, and a steering signal based on type information, position information, and speed information of nearby obstacles, and controls autonomous driving while performing an avoidance control for avoiding an obstacle based on at least one generated signal (206).

For example, the vehicle calculates the time to collision (Time to Collision, TTC) between the vehicle 1 and the front obstacle based on the position information (relative distance) and speed information (relative speed) of the obstacles ahead, and the vehicle warns the driver of a collision or transmits a braking signal to the braking system 32 or transmits a steering signal to the steering system 42 based on the result of the comparison between the time until the collision and a predetermined reference time.

In addition, the vehicle calculates the distance to collision (Distance to Collision, DTC) based on the speed information (ie, relative speed) of the obstacles ahead, and may warn the driver of a collision or transmit a braking signal to the braking system 32 based on a result of comparison between the distance to the collision and the distance to the obstacles ahead.

The vehicle determines whether the lane to be driven is a merge lane based on the map information, current location information, and navigation information (207).

Determining whether the lane to be driven is a merge lane includes determining whether the lane to be driven after a certain distance based on the current location is a merge lane based on the received map information, navigation information, and current location information.

When it is determined that the lane to be driven is a merge lane, the vehicle divides the lane area within a certain area from the current position into a plurality of sections (208). Here, the predetermined distance may be approximately 100 m.

The vehicle may obtain the lane width of the two lanes merged from the image data, and divide the lane area within the predetermined region into a plurality of sections based on the obtained lane width.

The vehicle may acquire the lane width of two merge lanes based on the map information and the current location information.

Figure 6:
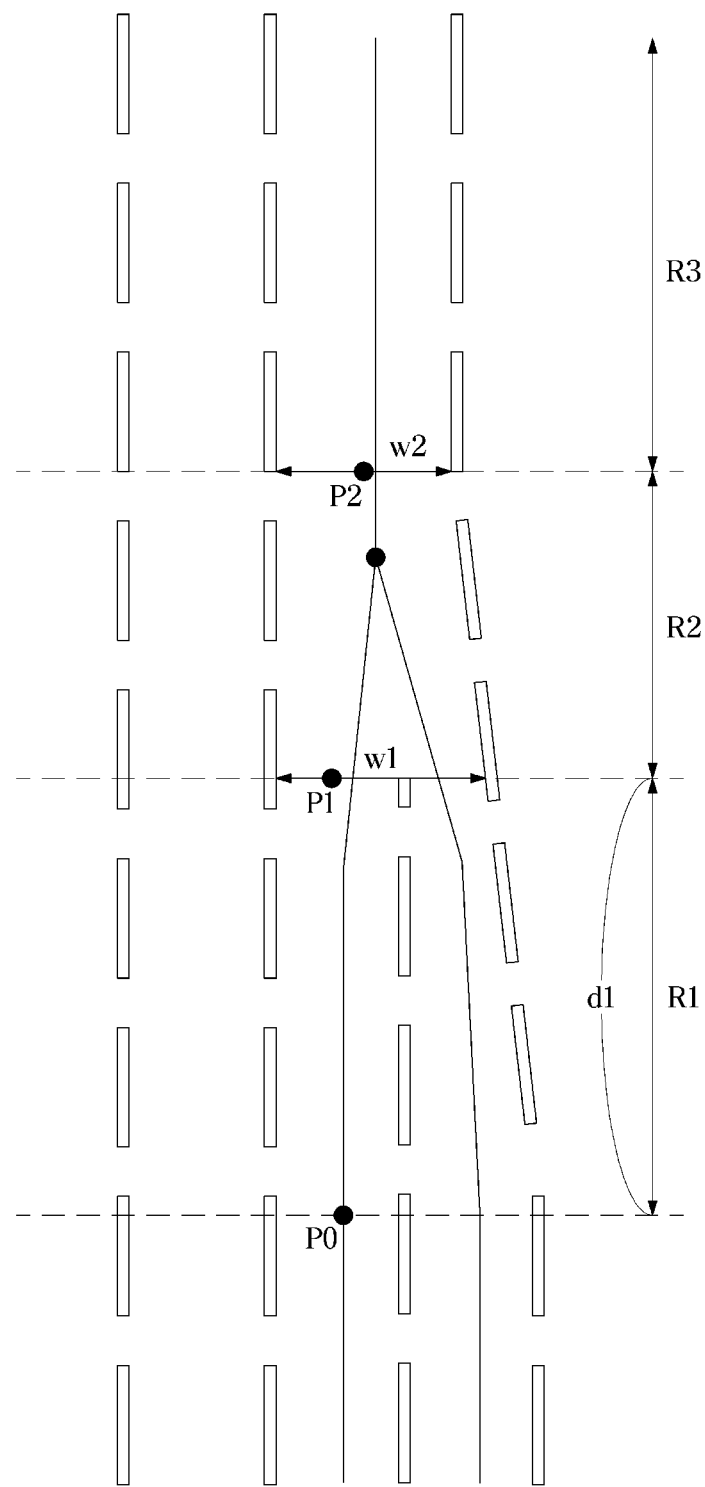
FIG. 6 is a diagram for a plurality of sections divided by a driver assistance device according to an embodiment.

As shown in FIG. 6, the vehicle may divides section into an entry section R1 where the first point P1 which is a certain distance d1 from the current position P0, merge section R2 from the first point P1 to the second point R2, and stabilization section R3 from the second point P2 to the third point P3.

Here, the merge section may be a section in which the boundary between the two lanes disappears.

The merge section is a section in which the first lane, which is an own lane, and the second lane, which are other lanes, are merged. In this case, one of the two lanes constituting the first lane may be the same lane as one of the two lanes constituting the second lane. That is, the first lane and the second lane may share one lane, and the shared lane may be a lane that disappears in a merge section.

The stabilization section may be a section in which the width of the widened lane decreases as the two lanes merge.

The first point P1 may be a point where two lanes start to change into one.

The first point P1 may be a point where the width of the lane begins to decrease as the two lanes are merged into one.

The first point P1 may be a point where the width W1 of one lane starts to exceed the reference width.

The second point P2 may be a starting point at which the width W2 of the lane becomes less than or equal to the reference width.

The vehicle may periodically acquire the width of the lane between the two merge lanes, and may acquire a rate of change of the width of the lane acquired periodically. In this case, the second point P2 may be a starting point at which the rate of change of the width of the lane becomes less than the reference rate of change.

The vehicle generates route points in the entry section, the merge section, and the stabilization section based on image data, map information, and lane width, and generates a driving route by connecting the generated route points (209).

Figure 7:
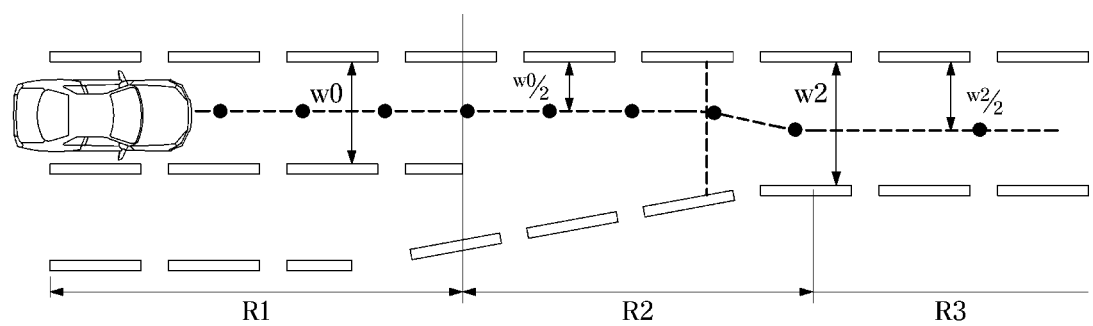
FIG. 7 is a diagram of a driving route generated by a driver assistance device according to an embodiment.
Figure 8:
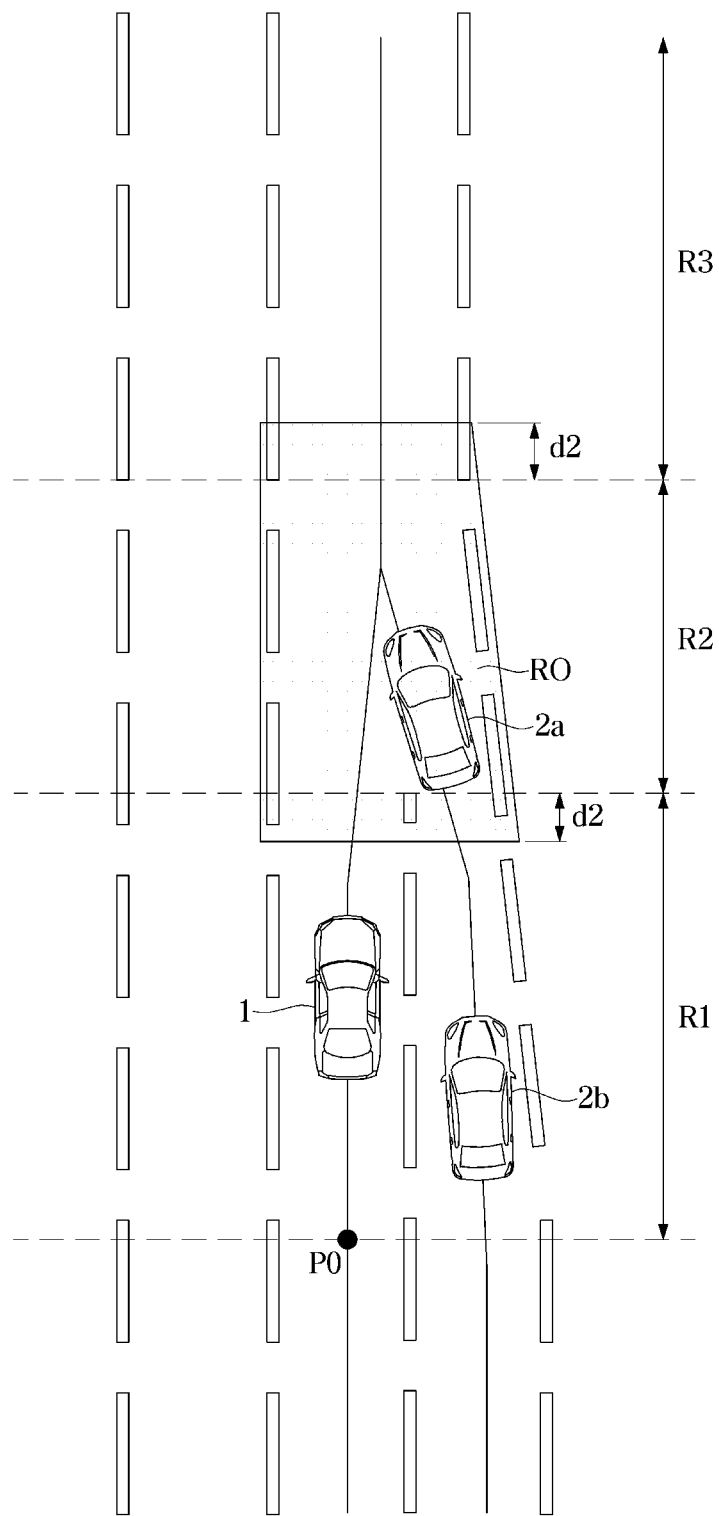
FIG. 8 is a diagram of a region of interest (ROI) set by a driver assistance apparatus according to an embodiment.

More specifically, as shown in FIG. 7, before entering the entry section, the vehicle acquires the width W0 of the lane within the entry section, and generates a route point at the center position of the lane based on the obtained lane width based on map information and video information.

Generating a route point at a center position of a lane within the entry section includes generating a route point at a position of "W0/2" from any one of two lanes constituting the lane within the entry section.

The vehicle generates a route point at a location of "W0/2" from a maintained lane among two lanes constituting a lane within a merge section based on map information and image information.

In other words, the vehicle generates a route point maintained at 'W0/2' in the merge section.

When the vehicle enters the stabilization section, the vehicle acquires the width W2 of the lane within the stabilization section based on the map degree and image information, and generates a route point within the stabilization section based on the obtained lane width W2.

Here, generating a route point at the center of the lane within the stabilization section, it includes generating a route point at a position that becomes 'W2/2' from any one of the two lanes forming a lane within the stabilization section.

The vehicle generates a driving route by performing curve fitting on route points generated in the entry section, the merge section, and the stabilization section.

Such a vehicle may output a third-order polynomial by performing curve fitting on path points generated in the entry section, the merge section, and the stabilization section.

The vehicle recognizes 210 other vehicles in the merge lane using image information acquired by the imaging device 110, obstacle information acquired by the obstacle detector 120, and map information stored in the storage 151.

In other words, the vehicle determines whether other vehicles are present in the merge lane, and acquires location information (relative distance) and speed information (relative speed) with other vehicles when the vehicle determines that another vehicle is in the merge lane based on obstacle information detected by obstacle detector 120, and acquires a Time to Collision (TTC) between the vehicle 1 and another vehicle based on the obtained location information (relative distance) and speed information (relative speed).

The vehicle 1 drives while adjusting the driving speed of the own vehicle 1 based on the speed information of the other vehicle 2a running in the merge section R2 when it is determined that another vehicle (2a) exists in the merge section (R2) before entering the entry section (R1) or before entering the entry section (R1). In this case, the vehicle 1 may travel at a driving speed equal to or slower than the driving speed of the other vehicle 2a.

When it is determined that another vehicle 2b exists in another lane of the entry section R1 when entering the entry section R1, the vehicle 1 generates (211) a speed profile of the own vehicle 1 based on the location information and speed information of the other vehicle 2b driving in the other lane of the entry section R1.

More specifically, the vehicle 1 sets the region of interest R0 based on the location information of the merge section R2 and the preset distance d2 information, and predicts the time T1 at which the other vehicle 2b enters the region of interest R0 based on the location information and speed information of the other vehicle.

The vehicle 1 may acquires an acceleration amount and a deceleration amount of the driving speed of another vehicle until the other vehicle 2b enters the region of interest R0 in the entry section R1. Based on the location information and speed information of the other vehicle (2b).

The vehicle acquires a time T2 for the own vehicle to enter the region of interest R0 based on the driving route information of the own vehicle and the driving speed information of the own vehicle, selects a driving strategy based on the time when the own vehicle enters the region of interest (T2) and the time when another vehicle enters (T1), and generates a speed profile based on the selected driving strategy.

When the vehicle determines that another vehicle exists in the region of interest at the time T2 of entering the region of interest (R0), the vehicle checks the amount of deceleration and acceleration for the driving speed of the other vehicle based on the location information and speed information of the other vehicle. The vehicle selects a yield strategy if the confirmed deceleration amount is less than the acceleration amount, and the vehicle selects an overtaking strategy when the acceleration amount is less than the deceleration amount.

The vehicle generates a speed profile that can avoid a collision in response to the selected strategy.

That is, the vehicle generates a speed profile that follows the back of another vehicle 2b after the time T2 to enter the region of interest in response to the yield strategy, and in response to the overtaking strategy, the vehicle generates a speed profile that can be positioned in front of another vehicle 2b after the time T2 to enter the region of interest.

If it is determined that there is no other vehicle driving in the merge lane, the vehicle may perform deceleration control to reduce the driving speed by a certain speed before entering the merge section.

The vehicle controls 212 autonomous driving while adjusting the driving speed based on the generated speed profile.

According to the present embodiment, by transmitting information on a hand signal recognized by a terminal or personal mobility to a surrounding vehicle, a surrounding infrastructure, and a server, a communication function for a road situation and a traffic situation can be performed in connection with other devices in the surroundings.

As described above, the present embodiment can improve the quality and product-ability of the terminal and personal mobility by providing signals to other users, and further increase the user's satisfaction and secure the competitiveness of the product.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

In addition, according to the present invention, it is possible to safely drive in the merge lane by recognizing the attention of the merge lane and the lane in the merge lane, and guiding the lane departure in response to the recognition result.

The present invention can perform stable autonomous driving in a state in which a hardware configuration is not added, thereby preventing an increase in cost due to the addition of a device.

The present invention can provide great convenience to the user, improve the marketability of driver assistance devices and vehicles, and further enhance user satisfaction, improve user convenience and reliability, and secure product competitiveness.

What is claimed is:

1. A driver assistance device, comprising:
   an image device configured to acquire an image of a road; and
   a controller connected to the image device and configured to:
      recognize lanes in the image acquired by the image device,
      recognize a first traveling road on which the vehicle is traveling based on position information of the recognized lanes,
      when it is determined that the first traveling road is a merging road that merges with a second traveling road, generate a first tracking line based on the position information of one of the lanes in an entry section of the merging road,
      when a rate of change of a width of the merging road is less than a reference rate of change, generate a second tracking line based on position information of a center of the width of the merging road,
      generate a driving route based on the first tracking line and the second first tracking line, and
      control autonomous driving based on the generated driving route.

2. The driver assistance device according to claim 1, further comprising:
   a communicator configured to receive current location information;
   a storage configured to store map information; and
   an input configured to receive destination information;
   wherein the controller is respectively connected to the communicator, the storage, and input, and is further configured to:
      generate navigation information based on the destination information received by the input and the current location information received by communicator, and
      determine whether the first traveling road is the merging road based on the generated navigation information, the map information stored in the storage, and the current location information.

3. The driver assistance device according to claim 2, wherein the controller is further configured to:
   divide a certain area including the merging road into the entry section, a merge section, and a stabilization section,
   generate route points within the entry section and the merge section based on a width of the first traveling road and the position information of one of the lanes,
   generate a route point based on the width of the merging road and the position information of one of the lanes in the stabilization section, and
   generate the driving route by connecting the route point of the entry section and the merge section, and the route point of the stabilization section.

4. The driver assistance device according to claim 3, wherein the controller connects the route points in the entry section and the merge section and the route point of the stabilization section by performing curve fitting.

5. The driver assistance device according to claim 3, wherein:
   the entry section is a section from a first point to a predetermined distance,
   the merge section is a section from the first point to a second point,
   the stabilization section is a section after the second point,
   the first point is a point at which the first traveling road and the second traveling road are changed into one road, and
   the second point is a point at which the rate of change in width of the merging road is less than the reference rate of change.

6. The driver assistance device according to claim 3 further comprising:
   an obstacle detector configured to detect other vehicles;
   wherein the controller is connected to the obstacle detector and is further configured to:
      set a region of interest based on location information of the merge section and preset distance information;
      acquire location information and speed information of the other vehicles detected by the obstacle detector;
      acquire time information for the other vehicles to enter the set region of interest based on the acquired location information and the speed information of the other vehicle; and adjust the driving speed based on the acquired time information, target driving speed and current location information.

7. The driver assistance device according to claim 1, wherein the first traveling road and the second traveling road each constitute multiple lanes that are merged together.

8. The driver assistance device according to claim 1 further comprising:
an obstacle detector configured to detect other vehicles;
wherein the controller is connected to the obstacle detector and is further configured to:
acquire location information and speed information of the other vehicles detected by the obstacle detector, and
adjust driving speed based on the location information and the speed information of the acquired other vehicles.

9. The driver assistance device according to claim 8, wherein the controller acquires an acceleration amount and a deceleration amount of the other vehicle based on the acquired location information and the speed information of the other vehicle, generates a speed profile based on the acceleration amount and the deceleration amount and adjusts the driving speed based on the generated speed profile.

10. A vehicle, comprising:
an image device configured to acquire an image of a road;
a communicator configured to receive current location information;
a storage configured to store map information;
an input configured to receive destination information; and
a controller configured to;
generate navigation information based on the destination information received by input and the current location information received by the communicator,
determine whether a traveling road to be driven is a merging road based on the generated navigation information, the map information stored in the storage, and the current location information,
recognize lanes in the image acquired by the image device,
recognize a first traveling road based on position information of the recognized lane,
when it is determined that the first traveling road is the merging road that merges with a second traveling road, generate a first tracking line based on the position information of one of the lanes in an entry section of the merging road,
when a rate of change of a width of the merging road is less than a reference rate of change, generate a second tracking line based on position information of a center of the width of the merging road, and
control autonomous driving based on the generated driving route.

11. The vehicle according to claim 10, wherein the controller is further configured to:
divide a certain area including the merging road into the entry section, a merge section, and a stabilization section,
generate route points within the entry section and the merge section based on the width of the first traveling road and the position information of one of the lanes,
generate a route point based on the width of the merging road and the position information of one of the lanes in the stabilization section, and
generate the driving route by performing curve fitting for the route points in the entry section and the merge section, and the route point of the stabilization section.

12. The vehicle according to claim 11, wherein:
the entry section is a section from a first point to a predetermined distance, the merge section is a section from the first point to a second point,
the stabilization section is a section after the second point,
the first point is a point at which the first traveling road and the second traveling road are changed into one road, and
the second point is a point at which the rate of change in width of the merging road is less than the reference rate of change.

13. The vehicle according to claim 11 further comprising:
an obstacle detector configured to detect other vehicles; and
wherein the controller acquires location information and speed information of the other vehicles detected by the obstacle detector when driving in the entry section, determines whether the other vehicle is driving in the merge section based on the acquired location information of the other vehicle, and controls to follow the other vehicle based on the speed information of the other vehicle when it is determined that the other vehicle is driving in the merge section.

14. The vehicle according to claim 11 further comprising:
an obstacle detector configured to detect other vehicles; and
wherein the controller is further configured to:
set a region of interest based on location information of the merge section and preset distance information,
determine whether there is other vehicle driving on the second traveling road based on the location information of the other vehicle detected by the obstacle detector,
acquire time information for the other vehicles to enter the set region of interest based on the acquired location information and the speed information of the other vehicle driving on the second traveling road; and
adjust the driving speed based on the acquired time information, target driving speed and current location information when it is determined that there is the other vehicle driving on the second traveling road.

15. The vehicle according to claim 14, wherein the controller is further configured to:
acquire an acceleration amount and a deceleration amount of the other vehicle based on the location information and speed information of the other vehicle driving on the second traveling road,
generate a speed profile based on the acceleration amount and the deceleration amount, and
adjust the driving speed based on the generated speed profile.

16. The vehicle according to claim 11 further comprising:
an obstacle detector configured to detect other vehicles;
wherein the controller is further configured to:
determine whether there is the other vehicle driving on the second traveling road based on the location information of the other vehicle detected by the obstacle detector, and
adjust the driving speed based on the location information and speed information of the other vehicle when it is determined that there is the other vehicle driving on the second traveling road.

17. A controlling method of a vehicle, the method comprising:
- generating navigation information based on destination information and current location information;
- determining whether a travelling road to be driven is a merging road lane based on the generated navigation information, the map information, and the current location information;
- recognizing lanes in an image acquired by an imaging device;
- recognizing a first traveling road based on position information of the lanes;
- dividing a certain area including the merge lane into an entry section, a merge section, and a stabilization section when it is determined that the first traveling road is a merging road that merges with a second traveling road,
- generating a first tracking line based on the position information of one of the lanes in an entry section of the merging road,
- generating a second tracking line based on position information of a center of the width of the merging road when a rate of change of a width of the merging road is less than a reference rate of change,
- generating a route point within the entry section and the merge section based on a width of the first traveling road and the position information of one of the lanes,
- generating a route point based on the width of the merging road and the position information of one of the lanes;
- generating a driving route by performing curve fitting for the route points in the entry section and the route point in the merge section; and
- controlling autonomous driving based on the generated driving route.

18. The method according to claim 17 further comprising:
- setting a region of interest based on the location information of the merge section and preset distance information;
- determining whether there is another vehicle traveling on the second traveling road based on the location information of the other vehicle detected by the obstacle detector;
- acquiring time information for the other vehicle to enter the set region of interest based on the location information and speed information of the other vehicle when it is determined that there is the other vehicle driving the second traveling road;
- acquiring an acceleration amount and a deceleration amount of the other vehicle based on the acquired time information, target driving speed and the current location information, and generating a speed profile based on the acceleration amount and the deceleration amount; and
- controlling the driving speed based on the generated speed profile.

19. The method according to claim 18, wherein generating the speed profile includes:
- generating the speed profile to overtake the other vehicle when the acceleration amount of the other vehicle is less than the deceleration amount; and
- generating the speed profile to follow the other vehicle when the deceleration amount of the other vehicle is less than the acceleration amount.

20. The method according to claim 17 further comprising:
- acquiring the location information and the speed information of the other vehicle detected by the obstacle detector when driving in the entry section;
- determining whether the other vehicle is driving in the merge section based on the acquired location information of the other vehicle; and
- controlling the driving speed to follow the other vehicle based on the speed information of the other vehicle when it is determined that the other vehicle is driving in the merge section.

* * * * *